A. C. BENNETT.
AEROPLANE.
APPLICATION FILED MAR. 31, 1910.
1,058,712.
Patented Apr. 15, 1913.
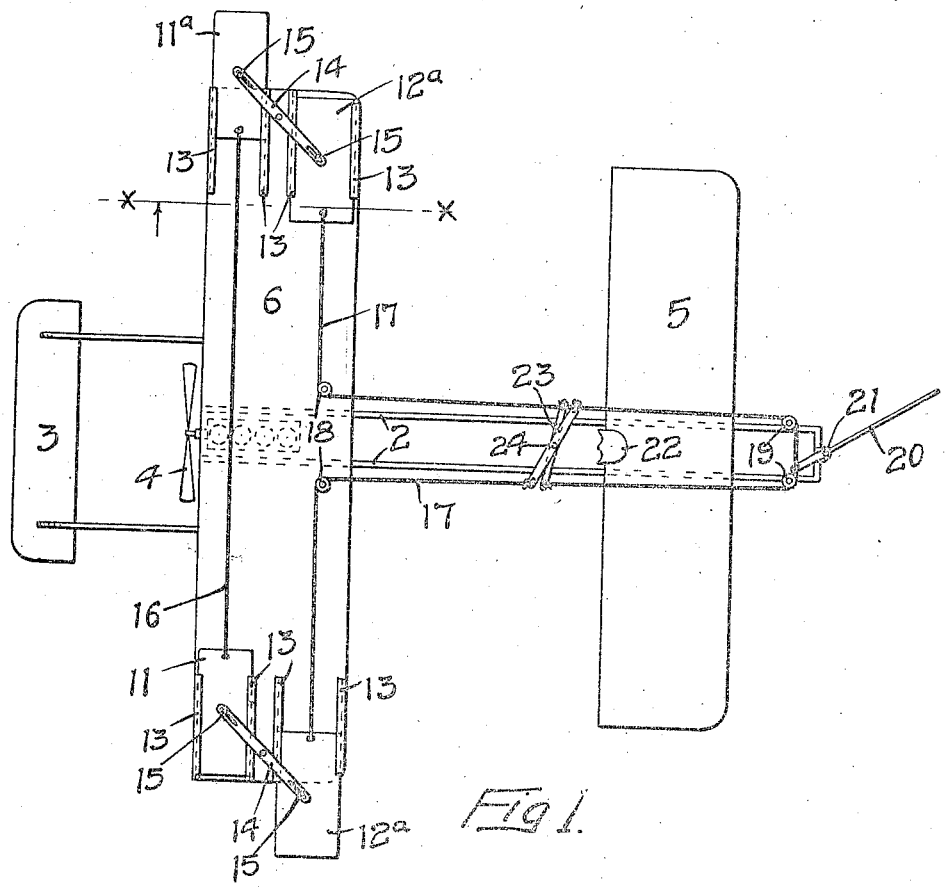
Fig 1.
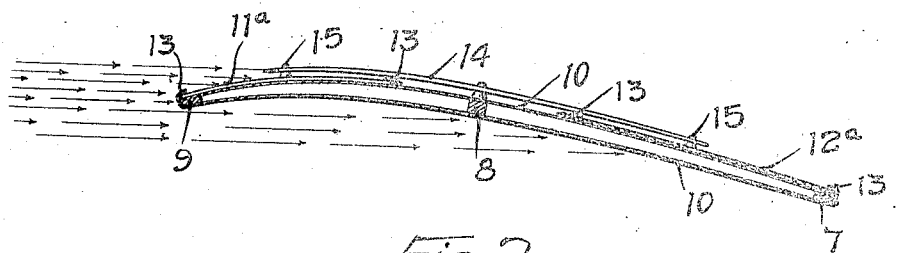
Fig 2. x-x
WITNESSES
INVENTOR
ASHLEY C. BENNETT
BY
ATTORNEYS

UNITED STATES PATENT OFFICE.

ASHLEY C. BENNETT, OF MINNEAPOLIS, MINNESOTA, ASSIGNOR OF ONE-HALF TO RALPH D. WILCOX, OF MINNEAPOLIS, MINNESOTA.

AEROPLANE.

1,058,712.   Specification of Letters Patent.   Patented Apr. 15, 1913.

Application filed March 31, 1910. Serial No. 552,659.

*To all whom it may concern:*

Be it known that I, ASHLEY C. BENNETT, of Minneapolis, Hennepin county, Minnesota, have invented certain new and useful Improvements in Aeroplanes, of which the following is a specification.

The object of my invention is to provide improved means for balancing the aeroplane or maintaining its equilibrium in strong currents of air or in turning the machine.

A further object is to provide a balancing means applicable to any type of aeroplane but designed particularly for aeroplanes of a single forward and rear plane in distinction from those of the bi-plane type.

The invention consists generally in reciprocating balancing planes arranged to operate transversely to the line of flight.

In the accompanying drawings forming part of this specification, Figure 1 is a plan view of an aeroplane with my invention applied thereto, Fig. 2 is a sectional view on the line $x$—$x$ of Fig. 1, looking in the direction of the arrow, showing the manner of mounting the balancing planes on the forward lifting plane.

In the drawing, 2 represents a suitable frame, 3 an altitude plane and 4 a propeller of suitable type.

5 is the rear lifting plane and 6 the forward lifting plane, composed of bars 7, 8 and 9 with a suitable cloth covering 10. These planes are suitably curved and at the outer ends of the plane 6 I provide balancing planes 11, 11ª, 12 and 12ª, slidably mounted in guides 13. The planes 11 and 11ª I prefer to designate as the balancing forward planes and the planes 12 and 12ª as the rear balancing planes. Bars 14 are pivoted on the plane 6 and have sliding connections at 15 at each end with the planes 11, 12, 11ª and 12ª. The opposite planes 11 and 11ª are connected by a cord 16 and a cord or cable 17 is attached at its ends to the planes 12 and 12ª and passes around pulleys 18 to a bar 23 that is pivoted at 24 in front of the seat 22. A similar bar 23′ is also pivoted at 24 and connected by a cord 17′ passing around pulleys 19 with the rudder 20 pivoted at 21 on the frame 2. These bars, 23 and 23′, are preferably operated by the feet to shift the rudder and retract or project the balancing planes, and one or both of the bars may be operated. That is, the rider may oscillate both bars simultaneously and move the balancing planes and the rudder simultaneously, or he may operate one of them at a time, according to the object to be attained.

Owing to the curvature of the plane 6, as shown in Fig. 2, the balancing planes 11 and 11ª will, when moved out beyond the ends of the plane 6, have a depressing effect, owing to the fact that the air currents, as indicated by the arrows in Fig. 2, will strike the upper surface of the balancing plane while, if the rear balancing planes 12 and 12ª be moved outwardly, the air currents will strike the underside of these planes and a lifting or elevating of the plane itself will result. In effect, the balancing planes serve to temporarily increase the area of the forward lifting planes for the purpose of aiding the elevation of the machine or depressing it. Whenever desired, the balancing planes may be adjusted in the same relative position where one will neutralize the action of the other.

In making a turn, the rear balancing plane on the outside may be thrown out to raise that side of the machine and cause the air currents to form a bank to resist the momentum of the machine while the turn is made.

The connection of the cord 17 with the rudder at the rear of the machine will cause it to be oscillated to conform to the position of the balancing planes, the degree of its movement being regulated by the travel of the balancing planes and their projection beyond the ends of the forward lifting plane.

The balancing planes may be made in different sizes and mounted in different ways on the lifting plane and in various ways the details of construction of the machine may be modified without departing from my invention.

I claim as my invention:—

1. In an aeroplane, a lifting plane, forward and rear balancing planes arranged to be projected laterally beyond said lifting plane, said forward balancing planes having a depressing effect and said rear balancing planes having an elevating effect, for the purpose specified.

2. In an aeroplane, a lifting plane, balancing planes mounted thereon and arranged to be projected outwardly beyond said lifting plane, said balancing planes being arranged in pairs, those on the same side of the lifting plane being connected with one another and the opposite corresponding planes on the two sides of the lifting plane being operatively connected with one another, whereby when one set of balancing planes is operated the other set will be actuated also.

3. In an aeroplane, a lifting plane, forward and rear balancing planes mounted thereon on each side, means connecting the forward balancing planes with one another across the machine, means connecting the forward and rear planes on the same side of the machine with one another, whereby when one plane is projected the other one will be withdrawn, and means within control of the operator for actuating said balancing planes.

4. In an aeroplane, forward and rear elevating planes, pairs of balancing planes arranged to be withdrawn or projected alternately beyond one of said elevating planes, a rudder, an oscillating bar and flexible means connecting it with said rudder, a second oscillating bar and flexible means connecting it with said balancing planes, for the purpose specified.

5. The combination, with the curved wing of an aeroplane, of two plates slidingly mounted at or near the outer end thereof on the forwardly inclined front and backwardly inclined rear sections, respectively, and means for simultaneously projecting one of said plates beyond and withdrawing the other to the edge of the wing section upon which it is mounted.

In witness whereof, I have hereunto set my hand this 24th day of March 1910.

ASHLEY C. BENNETT.

Witnesses:
L. C. CRONEN,
J. A. BYRNES.